United States Patent
Trimino et al.

(10) Patent No.: US 9,809,699 B2
(45) Date of Patent: Nov. 7, 2017

(54) ALTERNATIVE METHODS TO CONTROL CROSSLINKING IN HIGH IMPACT POLYSTYRENE

(71) Applicant: FINA TECHNOLOGY, INC., Houston, TX (US)

(72) Inventors: Giovanni Trimino, Houston, TX (US); Carlos DeAnda, Houston, TX (US); David W. Knoeppel, League City, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 14/927,528

(22) Filed: Oct. 30, 2015

(65) Prior Publication Data

US 2017/0121501 A1  May 4, 2017

(51) Int. Cl.
*C08L 25/06* (2006.01)
*C08K 5/524* (2006.01)
(Continued)

(52) U.S. Cl.
CPC .............. *C08K 5/524* (2013.01); *C08K 5/105* (2013.01); *C08K 5/17* (2013.01); *C08K 5/20* (2013.01); *C08K 5/3492* (2013.01); *C08K 5/353* (2013.01); *C08L 25/06* (2013.01); *C08L 51/003* (2013.01); *C08L 51/04* (2013.01)

(58) Field of Classification Search
CPC .... C08F 279/00; C08F 279/02; C08F 279/04; C08F 212/04; C08F 212/08; C08F 257/02;
(Continued)

(56) References Cited

U.S. PATENT DOCUMENTS 4,238,384 A * 12/1980 Blumberg ................. C08J 3/20
250/302
4,857,587 A * 8/1989 Sosa ..................... C08F 279/02
525/53
(Continued)

FOREIGN PATENT DOCUMENTS

FR       2882059 A1 * 8/2006 ................ B44F 1/06
WO  2013077908 A1    5/2013

OTHER PUBLICATIONS

FR 2882059 A1, Aug. 2006, DERWENT Ab.*
(Continued)

*Primary Examiner* — Satya Sastri
(74) *Attorney, Agent, or Firm* — Albert Shung

(57) ABSTRACT

High impact polystyrene may be formed with increased swell index and reduced or eliminated discoloration. A process of forming high impact polystyrene may include providing a polymerization system including a polymerization reactor and a devolatilizer. High impact polystyrene may be formed in the polymerization reactor, and sent to the devolatilizer. A polar antioxidant having a hindered phenol structure and an aliphatic amine group, and with a phosphite antioxidant may be added to the polymerization system. In another process, a chemical retarder and a fluorescent whitening agent may be added to the polymerization system. In another process, a chemical retarder that inhibits free radical rubber crosslinking may be added to the polymerization system.

12 Claims, 3 Drawing Sheets

(51) Int. Cl.
*C08L 51/00* (2006.01)
*C08L 51/04* (2006.01)
*C08K 5/105* (2006.01)
*C08K 5/17* (2006.01)
*C08K 5/20* (2006.01)
*C08K 5/3492* (2006.01)
*C08K 5/353* (2006.01)

(58) Field of Classification Search
CPC ........ C08L 51/04; C08L 51/003; C08L 25/06; C08K 5/13; C08K 5/14; C08K 5/16; C08K 5/524
See application file for complete search history.

(56) References Cited

U.S. PATENT DOCUMENTS

| | | | | |
|---|---|---|---|---|
| 5,240,993 | A | * | 8/1993 | Aerts .................. C08F 279/02 422/504 |
| 2008/0021157 | A1 | | 1/2008 | Sosa et al. |
| 2011/0046254 | A1 | | 2/2011 | Shin et al. |
| 2012/0245285 | A1 | * | 9/2012 | Knoeppel ............. C08F 279/02 524/740 |
| 2012/0296044 | A1 | | 11/2012 | Li et al. |
| 2015/0252134 | A1 | | 9/2015 | Tomlinson et al. |
| 2015/0259481 | A1 | | 9/2015 | Wang et al. |

OTHER PUBLICATIONS

Encyclopedia of Industrial Chemical Analysis, F.D. Snell and L.S. Ettre, Eds., vol. 18, p. 329 (1973), Interscience Publishers, New York.
Mayzo Inc. "Product Data Sheet" <www.mayzo.com>; Oct. 20, 2015; pp. 1-2.
International Search Report and Written Opinion issued in PCT/US16/55456, dated Feb. 15, 2017, 15 pages.

* cited by examiner

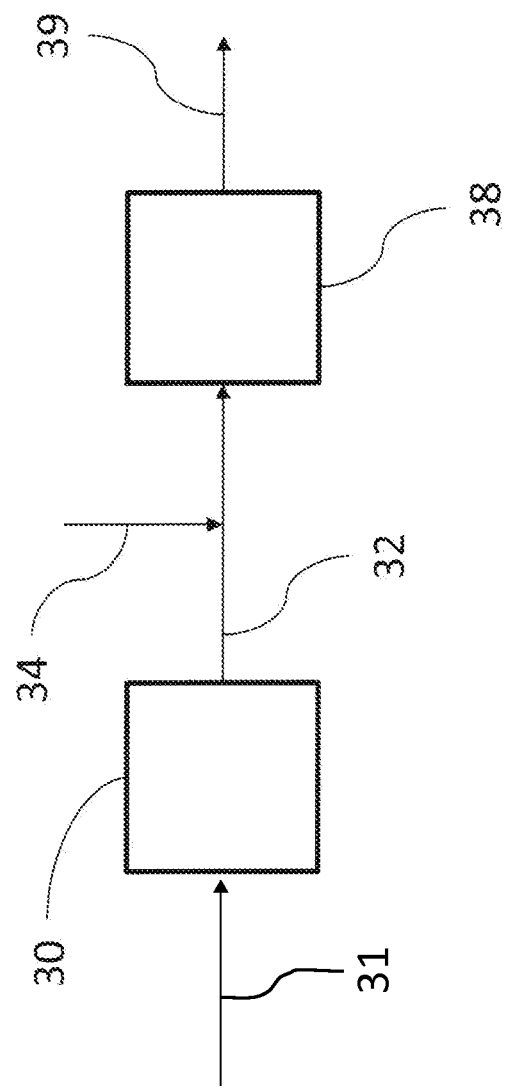

US 9,809,699 B2

ALTERNATIVE METHODS TO CONTROL CROSSLINKING IN HIGH IMPACT POLYSTYRENE

CROSS-REFERENCE TO RELATED APPLICATIONS

N/A.

FIELD

Embodiments of the present disclosure generally relate to the production of high impact polystyrene and other elastomer-reinforced polymers of vinyl aromatic compounds. More particularly, embodiments of the present disclosure relate to controlling crosslinking of the elastomeric phase of high impact polystyrene.

BACKGROUND

Elastomer-reinforced polymers of vinyl aromatic compounds, such as styrene, alpha-methylstyrene and ring-substituted styrene, have found commercial use. For example, elastomer-reinforced styrene polymers having discrete particles of cross-linked elastomer dispersed through the styrene polymer matrix may be useful for food packaging, office supplies, point-of-purchase signs and displays, housewares and consumer goods, building insulation, and cosmetics packaging. The incorporation of an elastomer into the styrene matrix may result in improvements in a range of physical and mechanical properties (e.g., impact strength) and collectively these polymers are termed high impact polystyrenes.

The utility of a particular high impact polystyrene may depend on the polymer having some combination of mechanical, thermal, and/or physical properties that render the material suitable for a particular application. These properties are related in part to the extent of incorporation of the elastomeric material into the polymer matrix. Many factors during polymerization can affect the properties of polymer. Once such factor is the degree of crosslinking in the rubber phase, which may result in decreased impact resistance, and environmental stress cracking resistance, which may be reflected by a lower swell index.

Some crosslinking may be desired for low to medium viscosity rubber to stabilize the rubber particle morphology through the devolatilization process. However, excess crosslinking may alter the elasticity of the elastomer phase and be detrimental to the final properties of high impact polystyrenes, such as impact strength and environmental stress cracking resistance.

Crosslinking control agents may be introduced to control the crosslinking in of high impact polystyrenes. However, some crosslinking control agents may cause discoloration in the resultant high impact polystyrene.

SUMMARY

The present disclosure provides for a process. The process includes providing a polymerization system that includes a polymerization reactor upstream of a devolatilizer. The process includes forming a high impact polystyrene within the polymerization reactor, and sending the high impact polystyrene to the devolatilizer. The process includes adding a polar antioxidant having a hindered phenol structure and an aliphatic amine group to the polymerization system at or upstream of the devolatilizer. The process includes adding a phosphite antioxidant to the polymerization system at or upstream of the devolatilizer.

The present disclosure also provides for a process that includes providing a polymerization system that includes a polymerization reactor upstream of a devolatilizer. The process includes forming a high impact polystyrene within the polymerization reactor, and sending the high impact polystyrene to the devolatilizer. The high impact polystyrene contains oxidizing agents. The process includes adding an antioxidant to the polymerization system at or upstream of the devolatilizer. The process includes adding a fluorescent whitening agent to the polymerization system at or upstream of the devolatilizer.

The present disclosure also provides for a process that includes providing a polymerization system that includes a polymerization reactor upstream of a devolatilizer. The process includes forming a high impact polystyrene within the polymerization reactor, and sending the high impact polystyrene to the devolatilizer. The process including adding a chemical retarder to the polymerization system at or upstream of the devolatilizer. The chemical retarder inhibits free radical rubber crosslinking in the devolatilizer.

BRIEF DESCRIPTION OF DRAWINGS

The present disclosure may be understood from the following detailed description when read with the accompanying figures.

FIG. 3 depicts a flow diagram of a process of forming high impact polystyrene in which crosslinking is controlled without causing discoloration.

DETAILED DESCRIPTION

Figure 1:
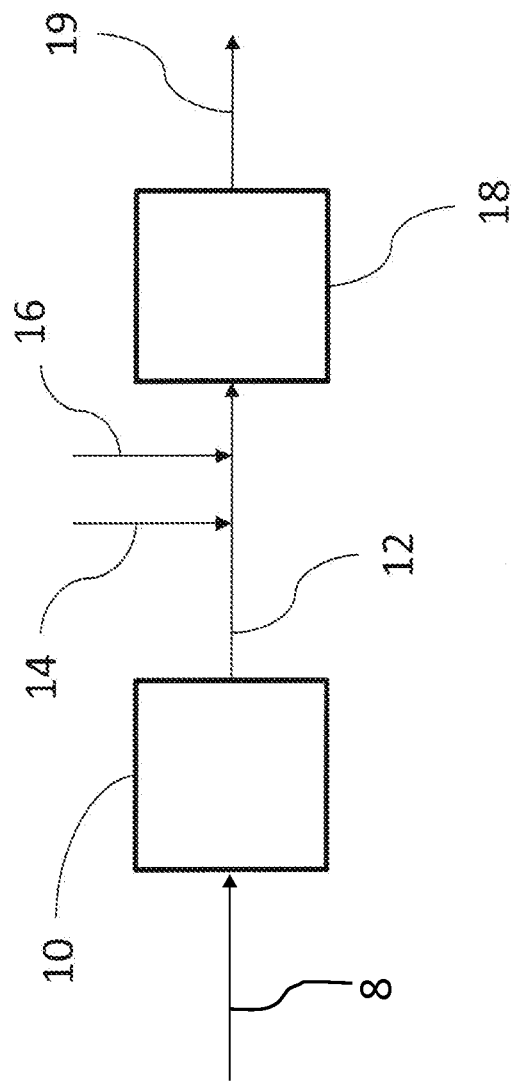
FIG. 1 depicts a flow diagram of a process of forming high impact polystyrene in which the efficiency of control of crosslinking is improved.

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

High Impact Polystyrene

High impact polystyrene (HIPS) refers to any elastomer-reinforced vinyl aromatic polymer. Vinyl aromatic monomers may include, but are not limited to, styrene, alpha-methylstyrene and ring-substituted styrene. HIPS may further include comonomers, including methylstyrene; halogenated styrenes; alkylated styrenes; acrylonitrile; esters of (meth)acrylic acid with alcohols having from 1 to 8 carbons; N-vinyl compounds such as vinylcarbazole, maleic anhydride; compounds which contain two polymerizable double bonds such as divinylbenzene or butanediol diacrylate; or combinations thereof. The comonomers may be present in an amount effective to impart one or more user-desired properties to the composition. Such effective amounts may be determined by one of ordinary skill in the art with the aid of this disclosure. For example and without limitation, comonomers may be present in the styrenic polymer composition in an amount of from 1 wt. % to 99.9 wt. % by total weight of a reaction mixture, alternatively from 1 wt. % to 90 wt. %, or from 1 wt. % to 50 wt. %.

Elastomeric material of HIPS is typically embedded in a polystyrene matrix as an elastomeric phase. Examples of elastomeric materials include conjugated diene monomers include without limitation 1,3-butadiene, 2-methyl-1,3-butadiene, 2-chloro-1,3 butadiene, 2-methyl-1,3-butadiene, and 2-chloro-1,3-butadiene. Alternatively, HIPS may include an aliphatic conjugated diene monomer as an elastomer. For example and without limitation, suitable aliphatic conjugated diene monomers may include $C_4$ to $C_9$ dienes, such as butadiene monomers. Blends or copolymers of the diene monomers may also be used. Likewise, mixtures or blends of one or more elastomers may be used. In an embodiment, the elastomer comprises a homopolymer of a diene monomer, alternatively, the elastomer comprises polybutadiene. The elastomer may be present in the HIPS in amounts effective to produce one or more user-desired properties. Such effective amounts may be determined by one of ordinary skill in the art with the aid of this disclosure. For example and without limitation, the elastomer may be present in the HIPS in an amount of from 1 wt. % to 20 wt. %, alternatively from 2 wt. % to 15 wt. %, or 5 wt. % to 11 wt. % based on the total weight of the HIPS.

Devolatilization

Upon completion of a polymerization reaction of HIPS, the HIPS is recovered from a polymerization reactor and subsequently processed, such as through devolatilization in a devolatilizer section. As used herein, a devolatilizer section may include a devolatilizer, and optionally a preheater upstream of the devolatilizer. Without being bound by theory, it is believed that a crosslinking reaction may occur in the elastomeric phase of the HIPS when the polymer melt runs through the devolatilizer section. The exposure to the relatively high temperatures in the devolatilizer section may initiate crosslinking of the elastomeric phase, such as polybutadiene chains, through a free radical mechanism. The amount of crosslinking, as measured by the swell index of HIPS, may be controlled by addition of chemical retarder, such as an antioxidant and/or thermal stabilizer. The chemical retarder may act as a crosslinking retarder to the polymer melt prior to the devolatilizer section to slow the crosslinking reaction. The chemical retarder may prevent over crosslinking of the elastomeric phase, thus preserving the elastic characteristic of the HIPS. Use of the chemical retarder may improve the rubber utilization efficiency and physical properties of the resultant HIPS.

As used herein, swell index values are a direct measure of the state of crosslinking in the elastomeric phase. As the level of crosslinking increases, swell index values decrease. Swell index and gel content are determined using a procedure outlined in the "Encyclopedia of Industrial Chemical Analysis", F. D. Snell and L. S. Ettre, Eds., Vol. 18, p. 329 (1973), Interscience Publishers, New York, incorporated herein by reference. The gel content, which expresses the degree of grafting, i.e. the quantity of polystyrene grafted on to the rubber, is determined by shaking 1 g of the HIPS in 20 ml of toluene at room temperature, and then centrifuging the whole to separate toluene-insoluble gel from the remainder.

As used herein, yellowness index is measured in accordance with ASTM D5290.

Improved Efficiency of Crosslinking Control

Certain embodiments of the present disclosure relate to a process of forming HIPS in which the efficiency of control of crosslinking is improved. In some embodiments, the amount of crosslinking, as measured by the swell index of HIPS, may be controlled by addition of an antioxidant, for example. The antioxidant may act as a chemical retarder to the polymer melt to slow the crosslinking reaction.

In some embodiments, the antioxidant is a polar antioxidant having a hindered phenol structure and an aliphatic amine group. For example and without limitation, the antioxidant may have the structure:

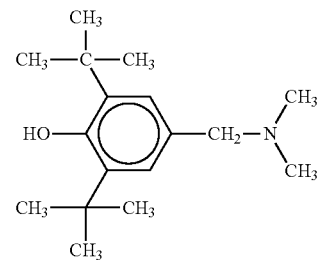

A polar antioxidant having such a structure is commercially available from SI GROUP® as ETHANOX® 4703, which is a lubricant antioxidant. Some physical properties of ETHANOX® 4703 are set forth in Table 1A, and solubility of ETHANOX® 4703 is set forth in Table 1B.

TABLE 1A

Physical Properties of ETHANOX ® 4703

| Form | crystalline powder |
|---|---|
| Color | light yellow |
| Molecular Weight | 263.4 |
| Melting Point, at 40 mm, ° F. (° C.) | 201 (94) |
| Boiling Point, at 40 mm, ° F. (° C.) | 354 (179) |
| Flash Point (COC), ° F. (° C.), min | >200 (>93) |
| Total Base Number, mg KOH/g | 214 |

TABLE 1B

Solubility of ETHANOX ® 4703

| Petroleum Oils | 2.0 wt %, at 20° C. |
|---|---|
| Dioctyl Sebacate | 6.8 wt %, at 20° C. |
| Toluene | 28 wt %, at 20° C. |
| Ethyl Alcohol | 29 wt %, at 20° C. |
| Water | <0.0007 wt %, at 20° C. |
| 10% NaOH | <0.002 wt %, at 20° C. |

Use of such an antioxidant for crosslinking control in the production of HIPS may result in HIPS exhibiting a yellow discoloration, which may be measured as yellowness index. Such yellow discoloration may be undesirable for certain applications.

Certain embodiments of the process include increasing the efficiency of such antioxidants such that a reduced concentration of the antioxidant may be utilized to provide the above discussed crosslinking control. Utilizing a reduced concentration of such antioxidants may reduce or eliminate the occurrence of yellow discoloration in the HIPS, while still maintaining at least the same level of crosslinking control, as measured by swell index.

In some embodiments, increasing the efficiency of the polar antioxidant such that a reduced concentration of the polar antioxidant may be utilized includes contacting the HIPS with the polar antioxidant in the presence of a phosphite antioxidant. FIG. 1 depicts a flow diagram of such a process in accordance with certain embodiments. The process may include providing a polymerization system, including reactor 10 and devolatilization section 18. Reactor product 12 may exit reactor 10 within which HIPS is polymerized. While depicted as a single reactor 10, reactor product 12 may be polymerized in multiple reactors, which may be arranged in series, parallel, or combinations thereof.

Reactor product 12 may flow from reactor 10 to devolatilization section 18, which may be located downstream of reactor 10. Devolatilization section 18 may include a devolatilizer and optionally a preheater upstream of the devolatilizer.

Phosphite antioxidant 14 and polar antioxidant 16 may be added to polymerization system at or upstream of devolatilization section 18. For example, upstream from or at devolatilization section 18, reactor product 12 may be contacted with phosphite antioxidant 14. Also, upstream from or at devolatilization section 18, reactor product 12 may be contacted with polar antioxidant 16. Thus, reactor product 12 may be contacted with polar antioxidant 16 in the presence of phosphite antioxidant 14. Contact of reactor product 12 with polar antioxidant 16 in the presence of phosphite antioxidant 14 may occur at or downstream of reactor 10 in which the reactor product 12 is formed, and at or upstream of devolatilization section 18.

While reactor product 12 is depicted as contacting phosphite antioxidant 14 prior to contacting polar antioxidant 16, reactor product 12 may contact polar antioxidant 16 prior to contacting phosphite antioxidant 14. Also, reactor product 12 may contact phosphite antioxidant 14 and polar antioxidant 16 simultaneously. For example and without limitation, phosphite antioxidant 14 and polar antioxidant 16 may contact one another prior to contact with reactor product 12. Also, while phosphite antioxidant 14 and polar antioxidant 16 are depicted as contacting reactor product 12 upstream of devolatilization section 18, phosphite antioxidant 14 and polar antioxidant 16 may be directly added to devolatilization section 18, either separately or combined, such that phosphite antioxidant 14 and polar antioxidant 16 initially contact reactor product 12 within devolatilization section 18. In some embodiments, phosphite antioxidant 14 and polar antioxidant 16 may be directly added to reactor 10, either separately or combined, such that phosphite antioxidant 14 and polar antioxidant 16 initially contact reactor product 12 and/or reactants 8 within reactor 10. In some embodiments, phosphite antioxidant 14 and polar antioxidant 16 may be added upstream of reactor 10, either separately or combined, such that phosphite antioxidant 14 and polar antioxidant 16 initially contact reactants 8 within upstream of reactor 10. Reactants 8 may include vinyl aromatic monomers and elastomeric materials, for example. HIPS product 19 obtained from devolatilization section 18 may have a reduced or eliminated occurrence of yellow discoloration and an increased swell index relative to HIPS made by an otherwise identical process without addition of phosphite antioxidant 14.

Polar antioxidant may be present in HIPS product 19 in an amount ranging from greater than 0 ppm to 1000 ppm, or 50 ppm to 900 ppm, or 100 ppm to 800 ppm, or 200 ppm to 600 ppm, or 300 ppm to 500 ppm, or 250 to 420 ppm, or 250 ppm, or 420 ppm (all by weight), for example.

In some embodiments, the phosphite antioxidant is tris (2,4-di-tert-butylphenyl) phosphite; triethyl phosphite; triphenyl phosphite; tris(nonylphenyl) phosphite; tris(dipropylene glycol) phosphite; or combinations thereof.

The phosphite antioxidant may be present in HIPS product 19 in an amount ranging from greater than 0 ppm to 1500 ppm, or 100 to 1400 ppm, or 200 to 1300 ppm, or 300 to 1200 ppm, or 400 to 1100 ppm, or 500 to 1000 ppm or 600 to 900 ppm or 700 to 800 ppm, or 500 to 700 ppm, or 500 ppm, or 700 ppm (all by weight), for example. In some embodiments, phosphite antioxidant is present in excess (by weight) relative to the amount of polar antioxidant present.

In certain embodiments, the HIPS obtained from the devolatilizer may exhibit a yellowness index of less than 10, less than 7, less than 6, less than 5, less than 4, less than 3, or less than 2.5. The HIPS may exhibit a yellowness index that is less than the yellowness index of HIPS obtained in an otherwise identical process in which the phosphite antioxidant is not added to the polymerization system and/or contacted with the HIPS. For example and without limitation, the HIPS may exhibit a yellowness index that is at least 5%, 10%, 20%, 30%, 40%, 50% or 60% less than the yellowness index of HIPS obtained in an otherwise identical process in which the phosphite antioxidant is added to the polymerization system and/or not contacted with the HIPS.

In certain embodiments, the HIPS obtained from the devolatilizer may exhibit a swell index of greater than 15%, greater than 16%, greater than 17%, greater than 18%, greater than 19%, greater than 20%, greater than 21%, greater than 22%, greater than 23%, greater than 24%, or greater than 25%. The swell index exhibited by the HIPS may be less than 30%. The HIPS may exhibit a swell index that is greater than the swell index of HIPS obtained in an otherwise identical process in which the phosphite antioxidant is not added to the polymerization system and/or contacted with the HIPS. For example and without limitation, the HIPS may exhibit a swell index that is at least 5%, 10%, 15%, 20%, 25%, 30%, 35% or 40% greater than the swell index of HIPS obtained in an otherwise identical process in which the phosphite antioxidant is not added to the polymerization system and/or contacted with the HIPS. Thus, the HIPS may exhibit a decreased yellowness index and an increased swell index relative to the yellowness index and swell index of HIPS obtained in an otherwise identical process in which the phosphite antioxidant is not added to the polymerization system and/or contacted with the HIPS.

Certain embodiments relate to HIPS made by the process of forming HIPS in which the efficiency of control of crosslinking is improved.

Whitening Effect

Certain embodiments relate to a process for reducing discoloration in HIPS that results from the addition of certain chemical retarders. In some embodiments, the chemical retarder is an antioxidant. For example and without limitation, the antioxidant may be a polar antioxidant having a hindered phenol structure and an aliphatic amine group, such as ETHANOX® 4703. Use of such an antioxidant for crosslinking control in the production of HIPS may result in HIPS exhibiting a yellow discoloration, which may be measured as yellowness index. While discussed herein with reference to a polar antioxidant having a hindered phenol structure and an aliphatic amine group, such as ETHA-NOX® 4703, the process for reducing discoloration in HIPS that results from the addition of certain chemical retarders may be performed with any chemical retarder (e.g., antioxidant) that results in HIPS exhibiting a yellow discoloration.

While not being bound by theory, it is believed that the yellow discoloration is caused by reaction between the chemical retarder and oxidizing agents present in the reactor product. For example and without limitation, the oxidizing agents may include peroxides, acids, aldehydes, or combinations thereof. The oxidizing agents may be present in a recycle stream that is added to the polymerization process, such as a recycle stream from a devolatilization section. The oxidizing agents may be formed within the polymerization reactor during the polymerization reaction. The chemical retarder may react with the oxidizing agents to form one or more side reaction products that reflect yellow light, including light having wavelengths ranging from greater than 510 nm to less than 590 nm. The presence of such side reaction products in the HIPS may cause the HIPS to reflect yellow light.

Figure 2:
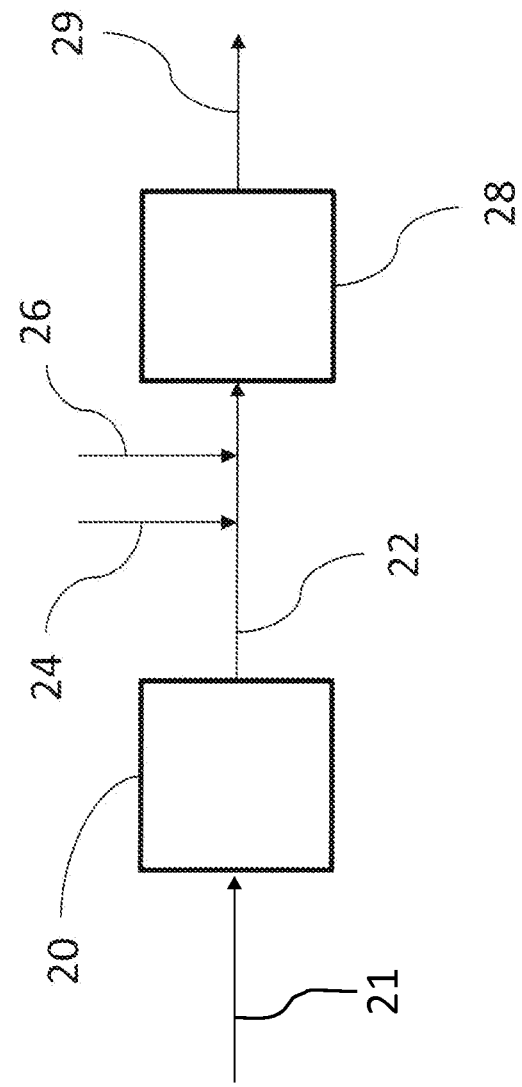
FIG. 2 depicts a flow diagram of a process of forming high impact polystyrene in which discoloration in the high impact polystyrene that may result from the addition of certain chemical retarders is reduced.

In some embodiments, reducing discoloration in HIPS that results from the addition of such chemical retarders may include contact of the HIPS with a fluorescent whitening agent. FIG. 2 depicts a flow diagram of such a process in accordance with certain embodiments. The process may include providing a polymerization system that includes reactor 20 and devolatilization section 28. Reactor product 22 may exit reactor 20 within which HIPS is polymerized. While depicted as a single reactor 20, reactor product 22 may be polymerized in multiple reactors, which may be arranged in series, parallel, or combinations thereof.

Reactor product 22 may flow from reactor 20 to devolatilization section 28, which may be located downstream of reactor 20. Devolatilization section 28 may include a devolatilizer and optionally a preheater upstream of the devolatilizer.

The process may include adding fluorescent whitening agent 24 and antioxidant 26 to polymerization section at or upstream of devolatilization section 28. Upstream from or at devolatilization section 28, reactor product 22 may be contacted with fluorescent whitening agent 24. Also, upstream from or at devolatilization section 28, reactor product 22 may be contacted with antioxidant 26 (e.g., polar antioxidant). While contact with antioxidant 26 is described with reference to FIG. 2, antioxidant 26 may be replaced with any chemical retarder that results in yellow discoloration in HIPS product 29. Reactor product 22 may be contacted with antioxidant 26 in the presence of fluorescent whitening agent 24. Contact of reactor product 22 with antioxidant 26 in the presence of fluorescent whitening agent 24 may occur at or downstream of reactor 20 in which the reactor product 22 is formed, and at or upstream of devolatilization section 28.

While reactor product 22 is depicted as contacting fluorescent whitening agent 24 prior to contacting antioxidant 26, reactor product 22 may contact antioxidant 26 prior to contacting fluorescent whitening agent 24. Also, reactor product 22 may contact fluorescent whitening agent 24 and antioxidant 26 simultaneously. For example and without limitation, fluorescent whitening agent 24 and antioxidant 26 may contact one another prior to contact with reactor product 22. Also, while fluorescent whitening agent 24 and antioxidant 26 are depicted as contacting reactor product 22 upstream of devolatilization section 28, fluorescent whitening agent 24 and antioxidant 26 may be directly added to devolatilization section 28, either separately or combined, such that fluorescent whitening agent 24 and polar antioxidant 26 initially contact reactor product 22 within devolatilization section 28. In some embodiments, fluorescent whitening agent 24 and antioxidant 26 may be directly added to reactor 20, either separately or combined, such that fluorescent whitening agent 24 and polar antioxidant 26 initially contact reactor product 22 and/or reactants 21 within reactor 20. In some embodiments, fluorescent whitening agent 24 and antioxidant 26 may be added upstream of reactor 20, either separately or combined, such that fluorescent whitening agent 24 and polar antioxidant 26 initially contact reactants 21 upstream of reactor 20. Reactants 21 may include vinyl aromatic monomers and elastomeric materials, for example.

The process may include obtaining HIPS product 29 from devolatilization section 28. HIPS product 29 may contain fluorescent whitening agent 24 and side reaction products that result from reaction between antioxidant 26 and oxidizing agents present in reactor product 22. In some embodiments, oxidizing agents are formed as side products within reactor 20. Fluorescent whitening agent 24 within the HIPS product 29 may reflect blue light, including light having wavelengths ranging from greater than 445 to less than 510 nm. Side reaction products within HIPS product 29 may reflect yellow light, including light having wavelengths ranging from greater than 510 to less than 590 nm.

HIPS product 29 obtained from devolatilization section 28 may exhibit a "whitening effect." As used herein, the "whitening effect" refers to a perceived reduction or elimination of the occurrence of yellow discoloration in HIPS product 29. While not being bound by theory, "whitening effect" may be caused by the simultaneous reflection of both yellow light from the side reaction products in HIPS product 29 and blue light from fluorescent whitening agent 24 in HIPS product 29. Such a simultaneous reflection of both yellow light and blue light may result in perception of "white light" and a perceived reduction or elimination of the occurrence of yellow discoloration relative to HIPS made without addition of fluorescent whitening agent 24. HIPS product 29 may also exhibit an increased swell index relative to HIPS made without addition of antioxidant 26.

In some embodiments, chemical retarder (e.g., antioxidant) is present in HIPS product 29 in an amount ranging from greater than 0 ppm to 1000 ppm, or 100 to 900 ppm, or 200 to 800 ppm, or 300 to 700 ppm, or 400 to 600 ppm, or greater than 0 to 250 ppm, or 250 ppm (all by weight), for example.

In certain embodiments, fluorescent whitening agent is 2,2'-(1,2-ethenediyl)bis(4,1-phenylene)bisbenxoxazole, which is commercially available from MAYZO® as BENETEX® OB-1. BENETEX® OB-1 has the following structure:

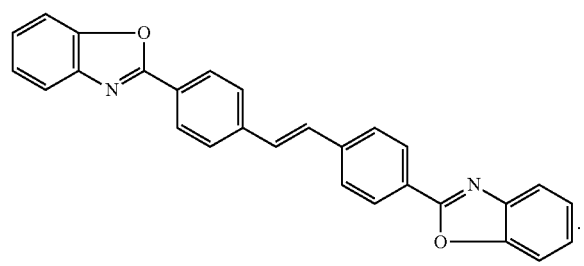 [SMILES: C(=C\c1ccc(-c2nc3ccccc3o2)cc1)/c1ccc(-c2nc3ccccc3o2)cc1]

In certain embodiments, fluorescent whitening agent is present in HIPS product 29 in an amount ranging from greater than 0 ppm to 2000 ppm, or 100 to 1800 ppm, or 200 to 1600 ppm, or 300 to 1400 ppm, or 400 to 1200 ppm, or 500 to 1000 ppm, or 600 to 800 ppm (all by weight), for example. In certain embodiments, fluorescent whitening agent is present in HIPS product 29 in an amount ranging from greater than 0 ppm to less than 500 ppm, or 50 to 100 ppm, or 100 ppm or less. In some embodiments, fluorescent whitening agent is present in HIPS product 29 in an amount ranging from 50 ppm to 1000 ppm, 50 to 500 ppm, or 50 to 100 ppm, or 100 to 500 ppm, or 100 to 1000 ppm, or 500 to 1000 ppm, or 50 ppm, or 100 ppm, or 500 ppm, or 1000 ppm (all by weigh), for example.

In some embodiments, the chemical retarder (e.g., antioxidant) is present in excess (by weight) relative to the amount of fluorescent whitening agent. For example and without limitation, 250 ppm of chemical retarder may be present with 50 ppm of fluorescent whitening agent in HIPS product 29, or 100 ppm of fluorescent whitening agent, or 500 ppm of fluorescent whitening agent, or 1000 ppm of fluorescent whitening agent (all by weight). In some embodiments, 250 ppm of chemical retarder may be present with 50 ppm to 100 ppm of fluorescent whitening agent in HIPS product 29, or 50 to 500 ppm of fluorescent whitening agent, or 50 to 1000 ppm of fluorescent whitening agent, or 100 to 500 ppm of fluorescent whitening agent, or 100 to 1000 ppm of fluorescent whitening agent, or 500 to 1000 ppm of fluorescent whitening agent (all by weight).

The HIPS may exhibit a yellowness index of less than 5, less than 4, less than 3, less than 2, or less than 1. In some embodiments, the HIPS may exhibit a negative yellowness index. For example and without limitation, the HIPS may exhibit a yellowness index of less than 0, less than −2, less than −5, less than −10, less than −12, less than −15, less than −16, or less than −17.

The HIPS may exhibit a yellowness index that is less than the yellowness index of HIPS obtained in an otherwise identical process in which fluorescent whitening agent is not added to the polymerization system and/or contacted with HIPS. For example and without limitation, the HIPS may exhibit a yellowness index that is at least 100%, 300%, 500%, 700%, or 800% less than the yellowness index of HIPS obtained in an otherwise identical process in which the fluorescent whitening agent is not added to the polymerization system and/or contacted with the HIPS.

The HIPS may exhibit a swell index of greater than 15%, greater than 16%, greater than 17%, greater than 18%, greater than 19%, greater than 20%, greater than 21%, greater than 22%, or greater than 23%. The swell index exhibited by the HIPS may be less than 30%, or less than 25%.

The HIPS may exhibit a swell index that is greater than the swell index of HIPS obtained in an otherwise identical process in which the fluorescent whitening agent is not added to the polymerization system and/or contacted with the HIPS. For example and without limitation, the HIPS may exhibit a swell index that is at least 5%, 10%, 15%, 20%, 25%, or 30% greater than the swell index of HIPS obtained in an otherwise identical process in which the fluorescent whitening agent is not added to the polymerization system and/or contacted with the HIPS. Thus, the HIPS may exhibit a decreased yellowness index and an increased swell index relative to the yellowness index and swell index of HIPS obtained in an otherwise identical process in which the phosphite antioxidant is not added to the polymerization system and/or contacted with the HIPS.

Certain embodiments relate to HIPS made by the process for reducing discoloration in HIPS by adding fluorescent whitening agent.

Certain embodiments relate to a process in which any chemical retarder described herein (e.g., an antioxidant, such as a polar antioxidant having a hindered phenol structure and an aliphatic amine group, such as ETHANOX® 4703); any phosphite antioxidant as described herein; and any fluorescent whitening agent as described herein are added to the polymerization system at or upstream of the devolatilization zone.

Controlling Crosslinking in HIPS

Long residence times and high temperatures in devolatilization sections may result in excess rubber crosslinking, which may be detrimental to certain physical properties of HIPS. Certain embodiments relate to a process for controlling crosslinking in HIPS. FIG. 3 depicts a flow diagram of such a process in accordance with certain embodiments. The process may include providing a polymerization system including a polymerization reactor 30 and a devolatilization section 38. The process may including adding chemical retarder 34 at or upstream of devolatilization section 38. For example, the process may include contacting HIPS reactor product 32 with chemical retarder 34. Chemical retarder 34 may contact reactor product 32 upstream of devolatilization section 38. For example and without limitation, chemical retarder 34 may contact reactor product 32 at or downstream of reactor 30. While depicted as a single reactor 30, reactor product 32 may be polymerized in multiple reactors, which may be arranged in series, parallel, or combinations thereof. Reactor product 32 may flow from reactor 30 to devolatilization section 38, which may be located downstream of reactor 30. Devolatilization section 38 may include a devolatilizer and optionally a preheater upstream of the devolatilizer. While chemical retarder 34 is depicted as being added downstream of reactor 30, chemical retarder 34 may be added directly into reactor 30, such that chemical retarder 34 first contacts reactor product 32 and/or reactants 31 within reactor 30. In some embodiments, chemical retarder 34 may be added upstream of reactor 30, such that chemical retarder 34 first contacts reactants 31 upstream of reactor 30.

Chemical retarder 34 may inhibit free radical rubber crosslinking in devolatilization section 38. For example and without limitation, chemical retarder 34 may function to delay free radical rubber crosslinking Inhibiting free radical rubber crosslinking in devolatilization section 38 may preserve the elastic properties of the elastomeric phase of HIPS product 39 recovered from devolatilization section 38. Chemical retarder 34 may be present in HIPS product 39 in an amount ranging from greater than 0 ppm to 1000 ppm, or greater than 50 ppm to 700 ppm, or greater than 100 ppm to 500 ppm, or greater than 125 ppm to 400 ppm, or from 150 to 350 ppm, or from 150 to 250 ppm, or from 250 to 350 ppm, or about 150 ppm, or about 250 ppm, or about 350 ppm, for example.

In certain embodiments, chemical retarder is an antioxidant and thermal stabilizer. Chemical retarder may be a multifunctional antioxidant. For example and without limitation, chemical retarder may be 2,6-di-tert-butyl-4-(4,6-bis(octylthio)-1,3,5-triazin-2-ylamino)phenol, which is commercially available from MAYZO® as BNX® 565. BNX® 565 is typically in the form of a white to yellowish crystalline powder, has a melting point of 94 to 96° C., has a molecular weight of 598 g/mol, and has the following structure:

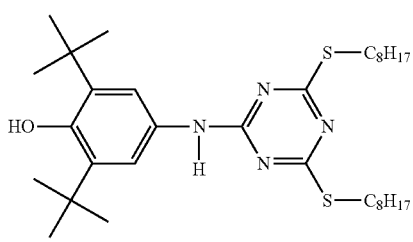

Table 2 sets forth solubility properties of BNX™ 565.

TABLE 2

Solubility of BNX ® 565

| Solvent | Solubility (wt. %) |
|---|---|
| Acetone | 20 |
| Benzene | 43 |
| Chloroform | 39 |
| Ethyl Acetate | 46 |
| Hexane | 6 |
| Methanol | 1.4 |
| Water | <0.01 |

In certain embodiments, chemical retarder is a sterically hindered phenolic antioxidant. For example and without limitation, chemical retarder may be N,N'-hexane-1,6-diyl-bis[3,5-di-tert-butyl-4-hydroxyphenylpropionamide)], which is commercially available from MAYZO® as BNX® 1098. BNX® 1098 has the following structure:

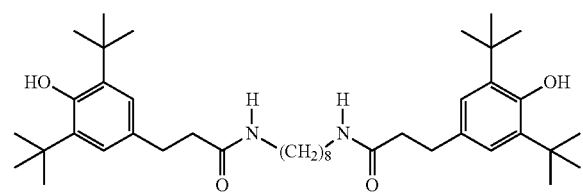

Certain physical properties of BNX® 1098 are set forth in Table 3A, and some solubility properties of BNX® 1098 are set forth in Table 3B.

TABLE 3A

Physical Properties of BNX ® 1098

| Appearance | white crystalline powder |
|---|---|
| Molecular Weight | 637 |
| Melting Point Range ° C. (° F.) | 156-161 (313-322) |
| Flash Point ° C. (° F.) | 282 (540) |
| Specific Gravity (20° C.) | 1.04 g/cm$^3$ |
| Vapor Pressure | 1.3 × 10$^{-12}$ Pa |

TABLE 3A-continued

Physical Properties of BNX ® 1098

| Volatility (TGA, in air at 20° C./min) | Temp. at 1% wt. loss = 280° C. |
|---|---|
| | Temp. at 10% wt. loss = 340° C. |

TABLE 3B

Solubility of BNX ® 1098 at 25° C. (g/100 ml solvent)

| Acetone | 2 |
|---|---|
| Benzene | 0.01 |
| Caprolactam | >20 |
| 95% Caprolactam + 5% water | >20 |
| 80% Caprolactam + 20% water | 3 |
| Chloroform | 6 |
| Ethyl Acetate | 1 |
| Hexane | 0.01 |
| Methanol | 6 |
| Water | 0.01 |

Chemical retarder may be a polymeric sterically hindered phenolic antioxidant. The polymeric sterically hindered phenolic antioxidant may be a butylated reaction product of p-cresol and dicyclopentadiene, which has the structure:

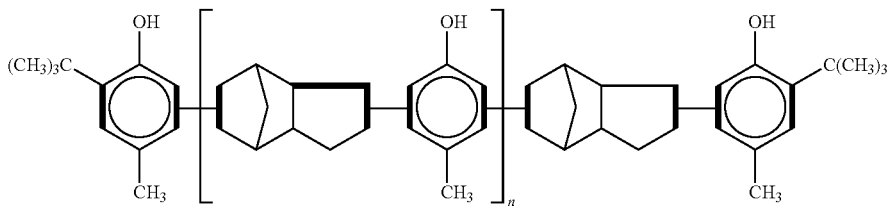

in which 'n' is an integer greater than 1. For example and without limitation, such a polymeric sterically hindered phenolic antioxidant is commercially available from MAYZO® as BNX® 8000. Certain physical properties of BNX® 8000 are set forth in Table 4A, and some solubility properties of BNX® 8000 are set forth in Table 4B.

TABLE 4A

Physical Properties of BNX ® 8000

| Appearance | flake |
|---|---|
| Color | yellow-brown |
| Molecular Weight | 600-800 |
| Melting Point Range ° C. | >104° C. |
| Specific Gravity (20° C.) | 1.04 |
| Bulk Density | 358 kg/m$^3$ |

TABLE 4B

Solubility of BNX ® 8000 at 25° C. (g/100 ml solvent)

| Water | <0.1 |
|---|---|
| Ethyl Acetate | 38 |
| Acetone | 19 |
| Methanol | 0.6 |
| n-Hexane | 32 |

In some embodiments, chemical retarder may be a hindered phenolic antioxidant, such as tetrakis[methylene-3(3',5'-di-tert-butyl-4-hydroxyphenyl)propionate]methane. Tetrakis[methylene-3(3',5'-di-tert-butyl-4-hydroxyphenyl)propionate]methane is commercially available from MAYZO® as BNX® 1010. Certain properties of BNX® 1010 are set forth in Tables 5A and 5B.

TABLE 5A

Physical Properties of BNX ® 1010

| Appearance | white crystalline granular |
| --- | --- |
| Molecular Weight | 1177.7 |
| Melting Point Range ° C. | 110-125 |
| Volatile matter | <0.5% |
| Solubility (10 g/100 ml Toluene) | Clear (25° C.) |
| % Transmittance | 425 nm-95% Min |
|  | 500 nm-97% Min |

TABLE 5B

Solubility of BNX ® 1010 at 25° C. (g/100 ml solvent)

| Solvent | Solubility |
| --- | --- |
| Acetone | 47% |
| Benzene | 56% |
| Chloroform | 71% |
| Ethanol | 1.5% |
| Ethyl Acetate | 46% |
| Hexane | 0.3% |
| Methanol | 1% |
| Methylene Chloride | 63% |
| Toluene | 60% |
| Water | <0.01% |

In some embodiments, chemical retarder is 2,6-di-tert-butyl-4-(4,6-bis(octylthio)-1,3,5-triazin-2-ylamino)phenol; N,N'-hexane-1,6-diylbis[3,5-di-tert-butyl-4-hydroxyphenyl-propionamide)]; tetrakis[methylene-3(3',5'-di-tert-butyl-4-hydroxyphenyl)propionate]methane; a butylated reaction product of p-cresol and dicyclopentadiene; or combinations thereof.

In certain embodiments, chemical retarder does not cause discoloration (e.g., yellow discoloration) of HIPS recovered from the devolatilization section. For example and without limitation, HIPS recovered from the devolatilization section in which contact with chemical retarder has occurred may not exhibit any change in yellowness index relative to a HIPS produced in an otherwise identical process in which chemical retarder is not used. Thus, such a chemical retarder may cause an increase in swell index without causing any change in discoloration, such as yellowness index.

Certain embodiments relate to a process in which any chemical retarder as described herein and any phosphite antioxidant as described herein are added to the polymerization system at or upstream of the devolatilization zone.

Certain embodiments relate to HIPS made a process in which such a chemical retarder is used.

Optional Additives

In an embodiment, the HIPS may also include additives as deemed necessary to impart desired physical properties, such as, increased gloss or color. Examples of additives include without limitation stabilizers, talc, antioxidants, UV stabilizers, lubricants, plasticizers, ultra-violet screening agents, oxidants, anti-oxidants, anti-static agents, ultraviolet light absorbents, fire retardants, processing oils, mold release agents, coloring agents, pigments/dyes, fillers, and the like. The aforementioned additives may be used either singularly or in combination to form various formulations of the composition. For example, stabilizers or stabilization agents may be employed to help protect the polymeric composition from degradation due to exposure to excessive temperatures and/or ultraviolet light. The additives may be added after recovery of the HIPS, for example during compounding such as pelletization.

These additives may be included in amounts effective to impart the desired properties. Effective additive amounts and processes for inclusion of these additives to polymeric compositions are known to one skilled in the art. For example, the additives may be present in an amount of from 0.1 wt. % to 50 wt. %, alternatively from 1 wt. % to 40 wt. %, alternatively from 2 wt. % to 30 wt. % based on the total weight of the composition.

Articles

Articles may be formed from the HIPS of the present disclosure. For example and without limitation, articles that may be formed of the HIPS include films, sheets, thermoformed articles, or foamed articles. An article may be obtained by subjecting the HIPS to a plastics shaping process, such as blow molding, extrusion, injection blow molding, injection stretch blow molding, thermoforming, or the like. The articles may include food packaging, office supplies, plastic lumber, replacement lumber, patio decking, structural supports, laminate flooring compositions, polymeric foam substrate, decorative surfaces, outdoor furniture, point-of-purchase signs and displays, house wares and consumer goods, building insulation, cosmetics packaging, outdoor replacement materials, lids and food/beverage containers, appliances, utensils, electronic components, automotive parts, enclosures, protective head gear, medical supplies, toys, golf clubs and accessories, piping, business machines and telephone components, shower heads, door handles, faucet handles, and the like.

EXAMPLES

The disclosure having been generally described, the following examples show particular embodiments of the disclosure. It is understood that the example is given by way of illustration and is not intended to limit the specification or the claims. All compositions percentages given in the examples are by weight.

Example 1—Improved Efficiency of Crosslinking Control

Test runs were performed in which a reaction product was transferred from a HIPS polymerization reactor to a devolatilization section. HIPS was recovered from the devolatilization section. Samples of HIPS from each test run were subjected to testing to determine yellowness index in accordance with ASTM D5290. Additionally, samples of HIPS from each test run were subjected to testing to determine swell index using the procedure outlined in the "Encyclopedia of Industrial Chemical Analysis", F. D. Snell and L. S. Ettre, Eds., Vol. 18, p. 329 (1973), Interscience Publishers, New York. Table 6 lists the data determined for the samples of each test run.

TABLE 6

Swell Index & Yellowness Index

| Reaction | ETHANOX ® 4703 (ppm, by weight) | Phosphite (ppm, by weight) | % Swell Index | Yellowness Index |
|---|---|---|---|---|
| Test Run 1: Baseline | 0 | 0 | 14.98 | −2.2 |
| Test Run 2: ETHANOX ® 4703 | 250 | 0 | 16.77 | 2.44 |
| Test Run 3: tris(2,4-di-tert-butylphenyl) phosphite | 250 | 500 | 20.90 | 2.18 |
| Test Run 4: ETHANOX ® 4703 | 420 | 0 | 18.28 | 6.05 |
| Test Run 5: triethyl phosphite | 420 | 700 | 25.28 | 3.07 |

Test Run 1 provides a baseline for swell index and yellowness index. In Test Run 1, the reaction product was transferred from the HIPS polymerization reactor to the devolatilization section without addition of antioxidants. Specifically, in Test Run 1 no ETHANOX® 4703 or phosphite antioxidant were added to the reaction product upstream of or at the devolatilization section. Test Run 1 has the lowest swell index of the test runs performed, as well as the lowest yellowness index.

In Test Run 2, ETHANOX® 4703 is added to the reaction product transferred from the HIPS polymerization reactor to the devolatilization section as a crosslinking control agent, such that the ETHANOX® 4703 is present in the devolatilization section with the HIPS. In Test Run 2, the reaction product was transferred from the HIPS polymerization reactor to the devolatilization section without addition of a phosphite antioxidant. As is evident from the data, the presence of ETHANOX® 4703 in the devolatilization section with the HIPS resulted in an increase in the swell index. However, the presence of ETHANOX® 4703 in the devolatilization section with the HIPS also resulted in an increase in the yellowness index.

In Test Run 3, ETHANOX® 4703 is added to the reaction product transferred from the HIPS polymerization reactor to the devolatilization section as a crosslinking control agent, such that the ETHANOX® 4703 is present in the devolatilization section with the HIPS. Additionally, a phosphite antioxidant is added to the reaction product transferred from the HIPS polymerization reactor to the devolatilization section, such that the phosphite antioxidant is present in the devolatilization section with the HIPS and the ETHANOX® 4703. The phosphite antioxidant added in Test Run 3 is tris(2,4-di-tert-butylphenyl) phosphite. Thus, Test Run 3 included the same amount of ETHANOX® 4703 as Test Run 2, but additionally included tris(2,4-di-tert-butylphenyl) phosphite. As is evident from the data, the presence of the phosphite antioxidant in combination with ETHANOX® 4703 in the devolatilization section with the HIPS resulted in a further increase in the swell index relative to both Test Runs 1 and 2. Additionally, the presence of the phosphite antioxidant in combination with ETHANOX® 4703 in the devolatilization section with the HIPS resulted in a decrease in the yellowness index relative to Test Run 2.

In Test Run 4, ETHANOX® 4703 is added to the reaction product transferred from the HIPS polymerization reactor to the devolatilization section as a crosslinking control agent, such that the ETHANOX® 4703 is present in the devolatilization section with the HIPS. In Test Run 4, the reaction product was transferred from the HIPS polymerization reactor to the devolatilization section without addition of a phosphite antioxidant. Test Run 4 included an increased amount of ETHANOX® 4703 relative to Test Run 2. The presence of additional ETHANOX® 4703 in the devolatilization section with the HIPS resulted in a further increase in the swell index relative to both Test Runs 1 and 2. However the swell index of Test Run 4 is decreased relative to the swell index of Test Run 3, which included less ETHANOX® 4703, but also included a phosphite antioxidant. Further, the increased addition of ETHANOX® 4703 resulted in a dramatic increase in the yellowness index relative to Test Runs 1, 2, and 3.

In Test Run 5, ETHANOX® 4703 is added to the reaction product transferred from the HIPS polymerization reactor to the devolatilization section as a crosslinking control agent, such that the ETHANOX® 4703 is present in the devolatilization section with the HIPS. Additionally, a phosphite antioxidant is added to the reaction product transferred from the HIPS polymerization reactor to the devolatilization section, such that the phosphite antioxidant is present in the devolatilization section with the HIPS and the ETHANOX® 4703. The phosphite antioxidant added in Test Run 5 is triethyl phosphite. Thus, Test Run 5 included the same amount of ETHANOX® 4703 as Test Run 4, but additionally included triethyl phosphite. As is evident from the data, the presence of the phosphite antioxidant in combination with ETHANOX® 4703 in the devolatilization section with the HIPS resulted in a further increase in the swell index relative to Test Runs 1, 2, 3, 4 and 5. Additionally, the presence of the phosphite antioxidant in combination with ETHANOX® 4703 in the devolatilization section with the HIPS resulted in a decrease in the yellowness index relative to Test Run 4.

Thus, the combination of ETHANOX® 4703 with a phosphite antioxidant allows for increase in the swell index of HIPS relative to the swell index of HIPS without the addition of these antioxidants, while additionally minimizing the increase in the yellowness index that occurs as a result of the presence of ETHANOX® 4703 in the devolatilization section with the HIPS.

Example 2—Whitening Effect

Test runs were performed in which a reaction product was transferred from a HIPS polymerization reactor to a devolatilization section. HIPS was recovered from the devolatilization section. Samples of HIPS from each test run were subjected to testing to determine yellowness index in accordance with ASTM D5290. Additionally, samples of HIPS from each test run were subjected to testing to determine swell index using the procedure outlined in the "Encyclopedia of Industrial Chemical Analysis", F. D. Snell and L. S. Ettre, Eds., Vol. 18, p. 329 (1973), Interscience Publishers, New York. Table 7 lists the data determined for the samples of each test run.

TABLE 7

Swell Index & Yellowness Index

| Reaction | Concentration (ppm) | % Swell Index | Yellowness Index |
|---|---|---|---|
| Test Run A: Baseline | 0 | 14.98 | −2.20 |

TABLE 7-continued

Swell Index & Yellowness Index

| Reaction | Concentration (ppm) | % Swell Index | Yellowness Index |
|---|---|---|---|
| Test Run B: ETHANOX ®4703 | 250 | 16.77 | 2.44 |
| Test Run C: ETHANOX ® 4703 + BENETEX OB-1 | 250 + 50 | 23.14 | −13.59 |
| Test Run D: ETHANOX ® 4703 + BENETEX OB-1 | 250 + 100 | 20.76 | −17.99 |
| Test Run E: ETHANOX ® 4703 + BENETEX OB-1 | 250 + 500 | — | −16.88 |
| Test Run F: ETHANOX ® 4703 + BENETEX OB-1 | 250 + 1000 | — | −13.40 |

Test Run A provides a baseline for swell index and yellowness index. In Test Run A, the reaction product was transferred from the HIPS polymerization reactor to the devolatilization section without addition of antioxidants or fluorescent whitening agents. Specifically, in Test Run A no ETHANOX® 4703 or fluorescent whitening agents were added to the reaction product upstream of or at the devolatilization section. Test Run A has the lowest measured swell index of the test runs performed.

In Test Run B, 250 ppm of ETHANOX® 4703 is added to the reaction product transferred from the HIPS polymerization reactor to the devolatilization section as a crosslinking control agent, such that the ETHANOX® 4703 is present in the devolatilization section with the HIPS. In Test Run B, the reaction product was transferred from the HIPS polymerization reactor to the devolatilization section without addition of fluorescent whitening agents. As is evident from the data, the presence of ETHANOX® 4703 in the devolatilization section with the HIPS resulted in an increase in the swell index relative to Test Run A. However, the presence of ETHANOX® 4703 in the devolatilization section with the HIPS also resulted in an increase in the yellowness index relative to Test Run A.

In Test Run C, 250 ppm of ETHANOX® 4703 is added to the reaction product transferred from the HIPS polymerization reactor to the devolatilization section as a crosslinking control agent, such that the ETHANOX® 4703 is present in the devolatilization section with the HIPS. Additionally, 50 ppm of a fluorescent whitening agent is added to the reaction product transferred from the HIPS polymerization reactor to the devolatilization section, such that the fluorescent whitening agent is present in the devolatilization section with the HIPS and the ETHANOX® 4703. The fluorescent whitening agent added in Test Run C is BENETEX® OB-1, commercially available from MAYZO®. BENETEX® OB-1 has the structure: 2,2'-(1,2-ethenediyl) bis(4,1-phenylene)bisbenzoxazole. Thus, Test Run C included the same amount of ETHANOX® 4703 as Test Run B, but additionally included 50 ppm of BENETEX® OB-1. As is evident from the data, the presence of the BENETEX® OB-1 in combination with ETHANOX® 4703 in the devolatilization section with the HIPS resulted in a further increase in the swell index relative to both Test Runs A and B. Additionally, the presence of the BENETEX® OB-1 in combination with ETHANOX® 4703 in the devolatilization section with the HIPS resulted in a dramatic decrease in the yellowness index relative to both Test Runs A and B.

In Test Run D, 250 ppm of ETHANOX® 4703 is added to the reaction product transferred from the HIPS polymerization reactor to the devolatilization section as a crosslinking control agent, such that the ETHANOX® 4703 is present in the devolatilization section with the HIPS. Additionally, 100 ppm of BENETEX® OB-1 is added to the reaction product transferred from the HIPS polymerization reactor to the devolatilization section, such that BENETEX® OB-1 is present in the devolatilization section with the HIPS and the ETHANOX® 4703. As is evident from the data, the presence of additional BENETEX® OB-1 in combination with ETHANOX® 4703 in the devolatization section with the HIPS resulted in a decrease in the swell index relative to Test Run C. However, the swell index of Test Run D is higher that both Test Runs A and B. Further, the presence of additional BENETEX® OB-1 in combination with ETHANOX® 4703 in the devolatilization section with the HIPS resulted in a further decrease in the yellowness index relative to Test Runs A, B, and C. Test Run D exhibited the lowest yellowness index of any samples tested.

In Test Run E, 250 ppm of ETHANOX® 4703 and 500 ppm of BENETEX® OB-1 are added to the reaction product transferred from the HIPS polymerization reactor to the devolatilization section, such that both ETHANOX® 4703 and BENETEX® OB-1 are present in the devolatilization section with the HIPS. Swell index data for Test Run E was not obtained. The yellowness index of Test Run E increased relative to Test Run D, but is lower than Test Runs A, B, and C.

In Test Run F, 250 ppm of ETHANOX® 4703 and 1000 ppm of BENETEX® OB-1 are added to the reaction product transferred from the HIPS polymerization reactor to the devolatilization section, such that both ETHANOX® 4703 and BENETEX® OB-1 are present in the devolatilization section with the HIPS. Swell index data for Test Run F was not obtained. The yellowness index of Test Run F increased relative to Test Runs C, D, and E, but is lower than Test Runs A and B.

Example 3—Controlling Crosslinking in HIPS

Test runs were performed in which a reaction product was transferred from a HIPS polymerization reactor to a devolatilization section. HIPS was recovered from the devolatilization section. Upstream of the devolatilization section the HIPS was contacted with a chemical retarder.

In Test Run Ia, the HIPS was contacted with 150 ppm of BNX® 565. In Test Run Ib, the HIPS was contacted with 250 ppm of BNX® 565. In Test Run Ic, the HIPS was contacted with 350 ppm of BNX® 565.

In Test Run IIa, the HIPS was contacted with 150 ppm of BNX® 1098. In Test Run IIb, the HIPS was contacted with 250 ppm of BNX® 1098. In Test Run IIc, the HIPS was contacted with 350 ppm of BNX® 1098.

In Test Run IIIa, the HIPS was contacted with 150 ppm of BNX® 8000. In Test Run IIIb, the HIPS was contacted with 250 ppm of BNX® 8000. In Test Run IIIc, the HIPS was contacted with 350 ppm of BNX® 8000.

In Test Run IVa, the HIPS was contacted with 150 ppm of BNX® 1010. In Test Run IVb, the HIPS was contacted with 250 ppm of BNX® 1010. In Test Run IVc, the HIPS was contacted with 350 ppm of BNX® 1010.

Each test run (Ia through IVc) of each chemical retarder resulted in increased swell index relative to HIPS produced in an otherwise identical process without addition of the chemical retarder, and did not result in any discoloration. Thus, each of the chemical retarders tested may be used to control crosslinking in HIPS without increasing the yellowness index, for example.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed:

1. A process comprising:
providing a polymerization system comprising a polymerization reactor upstream of a devolatilizer;
forming a high impact polystyrene within the polymerization reactor;
sending the high impact polystyrene to the devolatilizer, wherein the high impact polystyrene contains oxidizing agents;
adding a chemical retarder to the polymerization system at or upstream of the devolatilizer, wherein the chemical retarder comprises an antioxidant having a hindered phenol structure and an aliphatic amine group; and
adding a fluorescent whitening agent to the polymerization system at or upstream of the devolatilizer.

2. The process of claim 1, wherein the polar antioxidant has the structure:

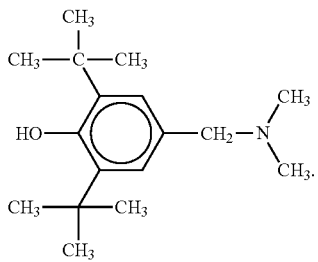

3. The process of claim 1, wherein the chemical retarder is present in the high impact polystyrene in an amount ranging from greater than 0 ppm to 1000 ppm.

4. The process of claim 1, wherein the oxidizing agents comprise peroxides, acids, aldehydes, or combinations thereof.

5. The process of claim 1, wherein the fluorescent whitening agent is 2,2'-(1,2-ethenediyl)bis(4,1-phenylene)bisbenzoxazole.

6. The process of claim 1, further comprising obtaining high impact polystyrene from the devolatilizer, wherein the fluorescent whitening agent reflects light having wavelengths ranging from greater than 445 to less than 510 nm.

7. The process of claim 1, wherein the chemical retarder reacts with the oxidizing agents, and wherein a product of reaction between the chemical retarder and the oxidizing agents reflects light having wavelengths ranging from greater than 510 to less than 590 nm.

8. The process of claim 1, further comprising obtaining high impact polystyrene from the devolatilizer, wherein a product of reaction between the chemical retarder and the oxidizing agents reflects light having wavelengths ranging from greater than 510 to less than 590 nm, wherein the fluorescent whitening agent reflects light having wavelengths ranging from greater than 445 to less than 510 nm, and wherein the obtained high impact polystyrene exhibits a whitening effect.

9. The process of claim 1, wherein the fluorescent whitening agent is present in the high impact polystyrene in an amount ranging from greater than 0 ppm to 2000 ppm.

10. The process of claim 1, further comprising obtaining high impact polystyrene from the devolatilizer exhibiting a yellowness index of less than 0 and a swell index of at least 5% greater than the swell index of a high impact polystyrene obtained in an otherwise identical process in which the fluorescent whitening agent is not added to the polymerization system.

11. The process of claim 1, wherein the high impact polystyrene exhibits a yellowness index that is less than the yellowness index of high impact polystyrene obtained in an otherwise identical process in which the fluorescent whitening agent is not added to the polymerization system, and wherein the high impact polystyrene exhibits a swell index that is greater than the swell index of high impact polystyrene obtained in an otherwise identical process in which the fluorescent whitening agent is not added to the polymerization system.

12. The process of claim 1, further comprising adding a phosphite antioxidant to the polymerization system at or upstream of the devolatilizer.

* * * * *